Aug. 22, 1933.        A. F. PREMO        1,923,843
METHOD OF PRODUCING COMPOSITE SLABS
Filed July 10, 1930
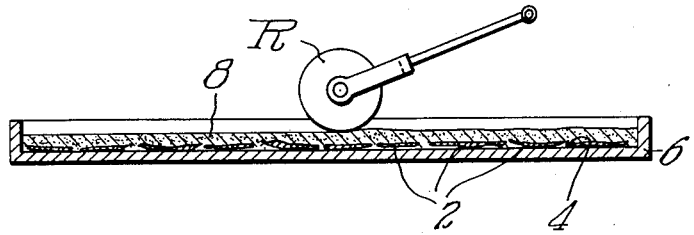
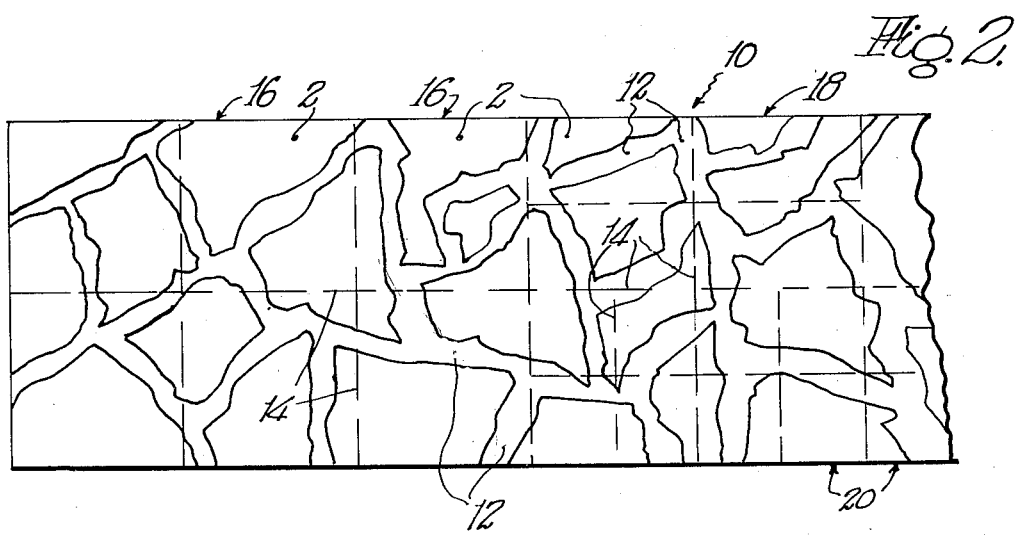
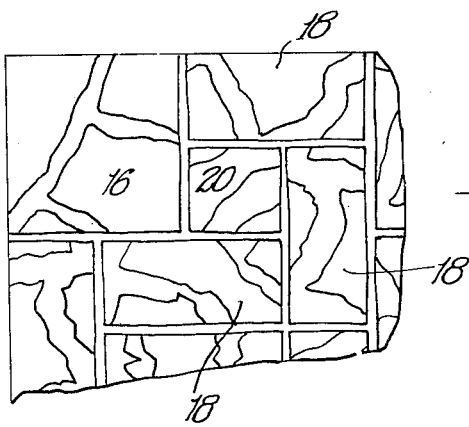
INVENTOR.
Albert F. Premo
BY Walter C. Ross
his ATTORNEY.

Patented Aug. 22, 1933

1,923,843

UNITED STATES PATENT OFFICE 1,923,843

METHOD OF PRODUCING COMPOSITE SLABS

Albert F. Premo, Springfield, Mass.

Application July 10, 1930. Serial No. 467,041

1 Claim. (Cl. 41—23)

This invention relates to improvements in the method of producing composite slabs and the product thereof.

It is common practice to form floors, terraces and the like by setting at random in cement more or less flat and irregular shaped pieces of stone, slate and the like so as to produce a random effect.

Due to the difficulty experienced in setting the stone and slate and because of the labor involved this method is objectionable. Also according to this method in order to have sufficient material available where the work is being done it is necessary to have at the place a larger quantity of slate or other material, in fact more than is actually needed for the work.

According to the novel features of this invention master slabs are produced which incorporate irregular pieces of slate or the like. These slabs are then cut to provide a plurality of unit slabs which may as units be assembled to form a floor, walk or the like. In this way various units may be assembled to provide a floor or terrace which has an appearance similar to that of the method of the prior art. By means of the units which themselves have the random effect they operate when assembled to provide an effect not possible according to the method described.

The various novel features and advantages of the invention will be observed from the following description thereof taken in connection with the accompanying drawing, wherein:

Fig. 1 is a longitudinal sectional view through an apparatus showing how the master slabs of the invention are produced.

Fig. 2 is a plan view of a master slab made according to the invention, and

Fig. 3 is a plan view of a section of a floor or the like made from unit sections of the master slab of Fig. 1.

Referring to the drawing the invention will be described in detail.

According to the invention a plurality of irregular shaped and substantially flat pieces of slate, stone or the like represented by the numeral 2 are distributed over the lower face 4 of a trench or making mold 6. These are arranged at random or irregularly to provide an irregular appearance which is much desired.

Over the pieces of slate or stone there is poured a layer of cement 8 which is in a more or less flowable state and in order to compact the cement and to force it between the pieces of slate a roller R is run over the cement and back and forth along the trench.

The cement is allowed to harden so that a composite master slab such as indicated by 10 is provided. This slab 10 may be removed from the mold and will appear as is shown in Fig. 2 wherein the face of the slab has a plurality of pieces of slate of irregular shape which are dispersed at random throughout.

Of course the pieces may be of different colors while the cement as at 12 will be visible in more or less irregular form to enhance the desired artistic random and irregular appearance.

By rolling the cement after the manner described it is caused to flow between the separate pieces of stone and over the upper edges thereof so that when hardened the pieces are securely locked together. In this way a strong and durable composite slab is provided which has stone or slate disposed at random throughout a surface thereof.

As a next step the master slab 10 is cut on lines indicated at 14 so as to provide separate units each of which will have in the upper surface thereof stone or slate of irregular shape dispersed throughout.

Preferably the cuts will be made so as to provide unit slabs of different sizes which will cooperate with one another to form some definite pattern or patterns. For instance there may be square units 16, half-square or oblong units 18 and quarter squares 20.

The units of different sizes may then be arranged in such a design as will form a walk, terrace, floor or the like, shown in Fig. 3. The units themselves which have an artistic random or irregular appearance provide when assembled as shown an appearance which is more irregular than can be obtained with the prior art method. That is, the unit slabs with their random effect are of such relative sizes that in assembling to provide a walk or floor, they enhance the random or irregular effect.

The unit slabs may be secured together in assembled relation by the means of cement or the like so as to provide a solid firm structure.

Having described the invention in the form at present preferred, what I now claim and desire to secure by Letters Patent of the United States is:

The method of making a terrace floor or the like which consists in, cutting transversely a relatively flat composite slab including a plurality of irregular shaped pieces of stone having relatively flat faces imbedded therein with the flat faces uppermost to provide units of regular shape having substantially straight marginal edges, reassembling said units with their faces uppermost and their marginal edges in parallelism and closely adjacent to form a design wherein the said faces of the stone pieces are in a relationship different from their original relationship of present units of irregular appearance but regular shape bounded by substantially regular strips between the units, and then in securing said units together by cement between their adjacent parallel edges and in said regular strips.

ALBERT F. PREMO.